United States Patent
Takeda et al.

(10) Patent No.: US 7,626,903 B2
(45) Date of Patent: Dec. 1, 2009

(54) OPTICAL DISC APPARATUS AND INFORMATION RECORDING AND REPRODUCING METHOD

(75) Inventors: Nobuhiro Takeda, Tokyo (JP); Mitsuru Harai, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 555 days.

(21) Appl. No.: 11/492,850

(22) Filed: Jul. 26, 2006

(65) Prior Publication Data

US 2007/0121444 A1    May 31, 2007

(30) Foreign Application Priority Data

Nov. 28, 2005    (JP)    ............................. 2005-341691

(51) Int. Cl.
    G11B 7/00    (2006.01)
(52) U.S. Cl. .................. 369/47.44; 369/94; 369/53.28; 369/44.32; 369/47.55
(58) Field of Classification Search .............. 369/44.25, 369/44.32, 47.4, 47.44, 53.28, 94, 47.55
    See application file for complete search history.

(56) References Cited

U.S. PATENT DOCUMENTS

2009/0028028 A1* 1/2009 Watanabe et al. ............. 369/94

FOREIGN PATENT DOCUMENTS

| JP | 2000-285607 | 10/2000 |
| JP | 2002-109822 | 4/2002 |
| JP | 2002-324322 | 11/2002 |
| JP | 2002-373419 | 12/2002 |
| JP | 2004-005817 | 1/2004 |
| JP | 2004-062945 | 2/2004 |
| JP | 2005-235265 | 9/2005 |
| JP | 2005-310289 | 11/2005 |
| JP | 2005-327425 | 11/2005 |

OTHER PUBLICATIONS

Office Action issued in Japanese Patent Application No. 2005-341691 on Mar. 31, 2009.

* cited by examiner

Primary Examiner—Thang V Tran
Assistant Examiner—Brenda Bernardi
(74) Attorney, Agent, or Firm—Antonelli, Terry, Stout & Kraus, LLP.

(57) ABSTRACT

Disclosed is an optical disc apparatus that sets a plurality of virtual zones, which correspond to a plurality of zones that are arranged in the radial direction of an optical disc, for a plurality of recording layers of the optical disc. When a servo signal distortion is detected in a virtual zone to change the rotation speed of the optical disc to a low speed in the virtual zone during an information recording or reproduction operation relative to a first recording layer, the optical disc apparatus stores the change information. When a recording or reproducing operation is to be performed in a virtual zone of a second recording layer, which is in the same disc radial position as the virtual zone of the first layer, the optical disc apparatus changes the rotation speed of the optical disc for the virtual zone to a low speed in accordance with the change information.

7 Claims, 8 Drawing Sheets

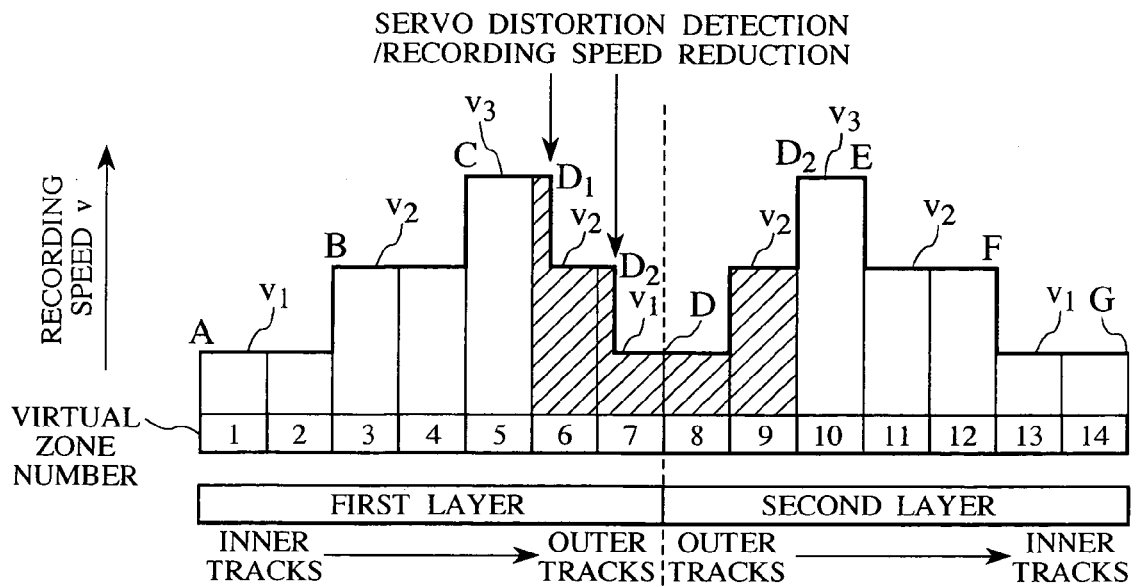
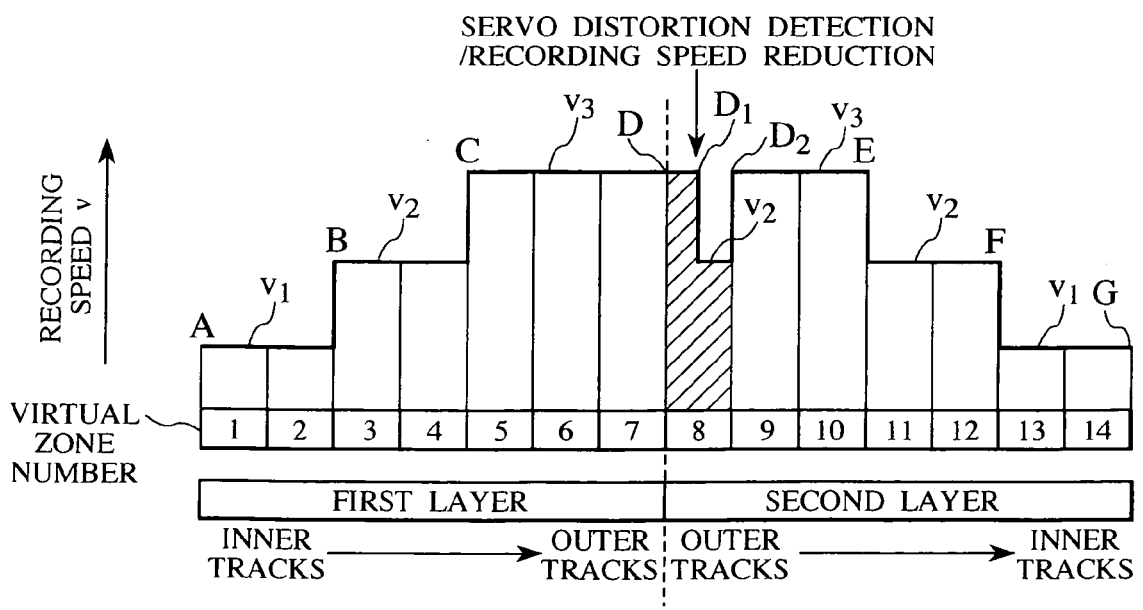

OPTICAL DISC APPARATUS AND INFORMATION RECORDING AND REPRODUCING METHOD

CLAIM OF PRIORITY

The present application claims priority from Japanese application serial No. P2005-341691, filed on Nov. 28, 2005, the content of which is hereby incorporated by reference into this application.

BACKGROUND OF THE INVENTION

1. Technical Field of the Invention

The present invention relates to an optical disc apparatus, and more particularly to a technology for recording information onto and reproducing information from a plurality of recording layers on an optical disc.

2. Description of the Related Art

There is a strong market need for increasing the recording speed, that is, reducing the recording time, of DVD±R discs and other optical discs having two recording layers. Conventionally, such a market need has been satisfied by increasing the rotation speed of an optical disc. However, when the rotation speed is increased, the focus servo and tracking servo become unstable due to the distortion possessed by the optical disc, thereby deteriorating the recording quality. Therefore, when a servo signal distortion is detected, the rotation speed of the optical disc is decreased to stabilize the focus servo and tracking servo with a view toward stabilizing the recording quality.

FIGS. 11A and 11B illustrate a conventional technology for an optical disc apparatus that records information onto or reproduces information from a double-layer optical disc. In the illustrated example, when a recording operation is performed from inner tracks to outer tracks of a first recording layer (first layer) and performed from outer tracks to inner tracks of a second recording layer (second layer), the recording operation in an inner first zone of the first layer is performed at a recording speed of $v_1'$; the recording operation in the next second zone, which begins at point P, is performed at a recording speed of $v_2'$; and the recording operation in the next third zone, which begins at point Q, is performed at a recording speed of $v_3'$. In the second layer, the recording operation in a third zone of the second layer, which is in the same disc radial position as the third zone of the first layer, is performed at a recording speed of $v_3'$; the recording operation in a second zone of the second layer, which is in the same disc radial position as the second zone of the first layer, is performed at a recording speed of $v_2'$; and the recording operation in a first zone of the second layer, which is in the same disc radial position as the first zone of the first layer, is performed at a recording speed of $v_1'$. If no distortion is detected in a servo signal, the recording operations in the first, second, and third zones of both the first and second layers are performed at recording speeds $v_1'$, $v_2'$, and $v_3'$, respectively. However, if a distortion is detected in the servo signal, the recording operations are performed as indicated in FIGS. 11A and 11B. FIG. 11A shows a case where a distortion is detected in the servo signal at point R of the third zone of the first layer. FIG. 11B shows a case where a distortion is detected in the servo signal at point S of the second zone of the first layer. In the case indicated in FIG. 11A, the recording speed is decreased at point R from $v_3'$ to $v_2'$, and the recording speed $v_2'$ is maintained until the recording operation for the second layer is terminated. Even in the third zone of the second layer, the recording speed does not revert to $v_3'$. Further, in the case indicated in FIG. 11A, the recording speed is decreased at point S from $v_2'$ to $v_1'$, and the recording speed $v_1'$ is maintained until the recording operation for the second layer is terminated. Even in the third zone of the first layer and in the third zone of the second layer, the recording speed does not revert to $v_3'$. Even in the second zone of the second layer, the recording speed does not revert to $v_2'$.

Another conventional technology is such that the recording speed is constantly lowered for outer tracks of the disc to cope with a distortion in the outer tracks.

Other conventional technologies related to the present invention are disclosed, for instance, by Japanese Patents JP-A No. 62945/2004 and JP-A No. 109822/2002. To record data in a stable manner even when the more outer track is, the lower quality is due to partial distortion of an optical disc, the technology disclosed by Japanese Patent JP-A No. 62945/2004 monitors high-frequency components of a tracking error signal and focusing error signal while data is recorded onto or reproduced from an optical disc at a high speed. If an eccentric acceleration or runout acceleration greater than a predetermined threshold value is detected, this technology decreases the linear velocity particularly for outer tracks at a predetermined ratio to lower the frequencies for eccentric acceleration and runout acceleration, and performs a recording or reproducing operation with the responses of the tracking servo and focusing servo improved. The technology disclosed by Japanese Patent JP-A No. 109822/2002 prevents a lack of read/write margin due to high-speed optical disc rotation in a storage apparatus using an optical disc. To maintain the focusing servo and tracking servo stable, this technology decreases the rotation speed of a spindle motor when the read/write margin is smaller than a first predetermined value or when tracking/focusing servo abnormality occurs more frequently than a first predetermined frequency. On the other hand, when the read/write margin is greater than a second predetermined value or when the tracking/focusing servo abnormality occurs less frequently than a second predetermined frequency, this technology increases the rotation speed of the spindle motor.

SUMMARY OF THE INVENTION

When a servo signal distortion is detected, the conventional technology illustrated in FIGS. 11A and 11B reduces the recording speed, and performs a subsequent recording operation at the reduced recording speed. Thus, the recording time increases when a servo signal distortion is detected. The recording time significantly increases when a servo signal distortion is detected while a recording operation is performed in relation to the first zone of the first layer. Further, since the conventional technology constantly decreases the recording speed for outer tracks of a disc, the recording speed decreases even when the disc is not distorted, resulting in an increase of the recording time. The technology disclosed by Japanese Patent JP-A No. 62945/2004 reduces the linear velocity particularly for outer tracks when an eccentric acceleration or runout acceleration greater than a threshold value is detected due to a partial optical disc distortion, and does not increase the recording speed later. It is therefore conceivable that the recording time increases when the optical disc is distorted. The technology disclosed by Japanese Patent JP-A No. 109822/2002 can increase the recording speed when the focusing error signal or tracking error signal is smaller than a threshold value. However, it is difficult for this technology to predict a servo signal distortion while a low recording speed is employed during high-speed rotation. Therefore, it is anticipated that the focusing error signal and tracking error signal may exceed a threshold value due to an increase in the recording speed, thereby causing the rotation speed of the disc motor to repeatedly alternate between deceleration and acceleration. As a result, it is conceivable that the recording time may increase.

The present invention has been made so that information can be recorded or reproduced within a short period of time by an optical disc apparatus that records information onto or reproduces information from a plurality of recording layers of an optical disc.

It is an object of the present invention to provide an easy-to-use optical disc apparatus that makes full use of a high-speed recording/reproducing technology.

The present invention is a technology that achieves the above object.

The optical disc apparatus according to the present invention sets a plurality of virtual zones corresponding to a plurality of zones that are arranged in the radial direction of an optical disc for a plurality of recording layers of the optical disc. When a servo signal distortion is detected in any of virtual zones to change the rotation speed of the optical disc to a low speed in the virtual zone at the time of information recording/reproduction relative to a first recording layer, the optical disc apparatus stores the change information. When a recording or reproducing operation is to be performed in a virtual zone of a second recording layer, which is in the same disc radial position as the virtual zone of the first layer, the optical disc apparatus changes the rotation speed of the optical disc for the virtual zone to a low speed in accordance with the change information.

BRIEF DESCRIPTION OF THE DRAWINGS

FIG. 9 shows a fourth example of recording speed control in the optical disc apparatus shown in FIG. 1.

FIG. 10 shows a fifth example of recording speed control in the optical disc apparatus shown in FIG. 1.

DETAILED DESCRIPTION OF THE PREFERRED EMBODIMENT

An embodiment of the present invention will now be described with reference to the accompanying drawings.

Figure 1:
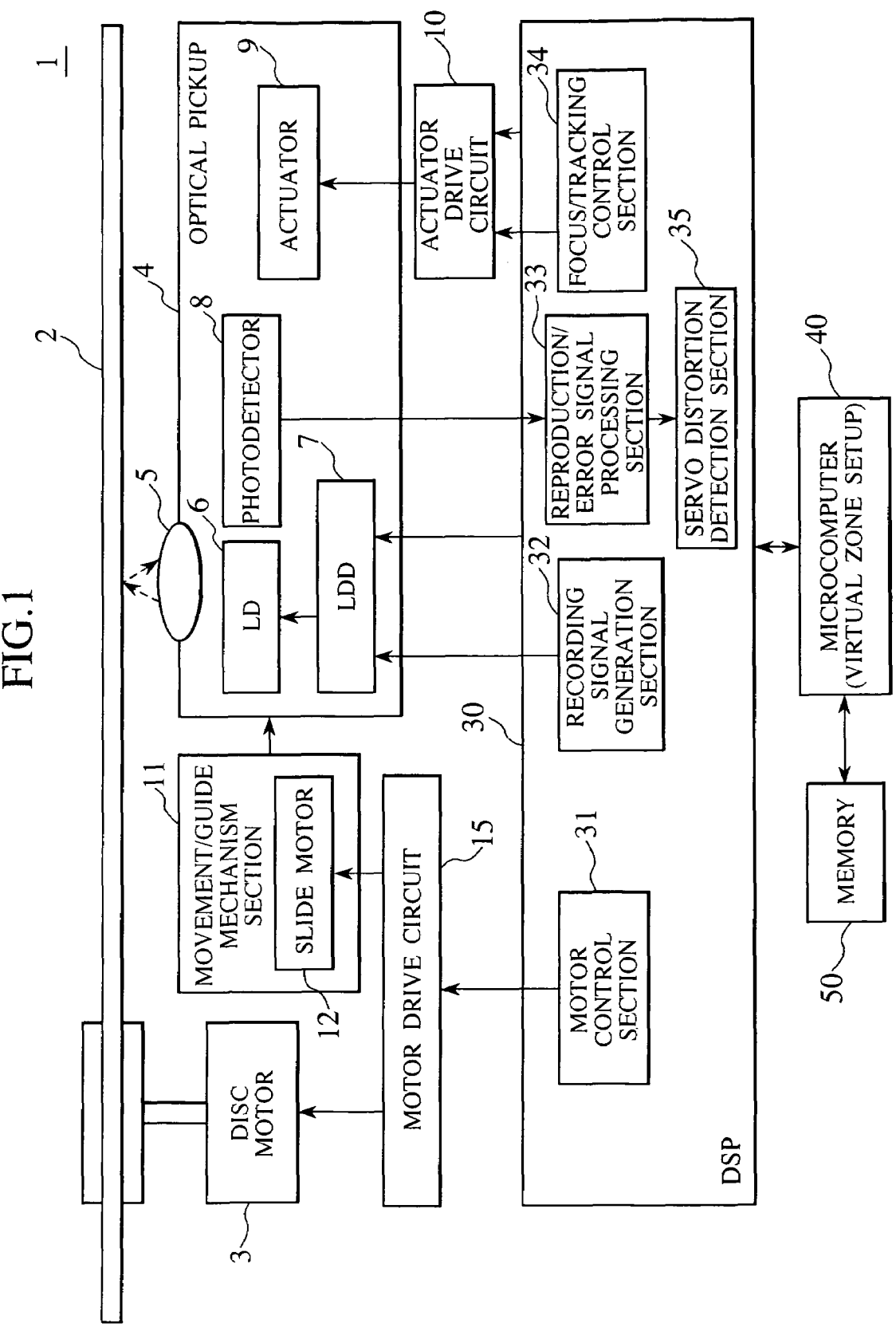
FIG. 1 illustrates a configuration of an optical disc apparatus according to one embodiment of the present invention.
Figure 2A:
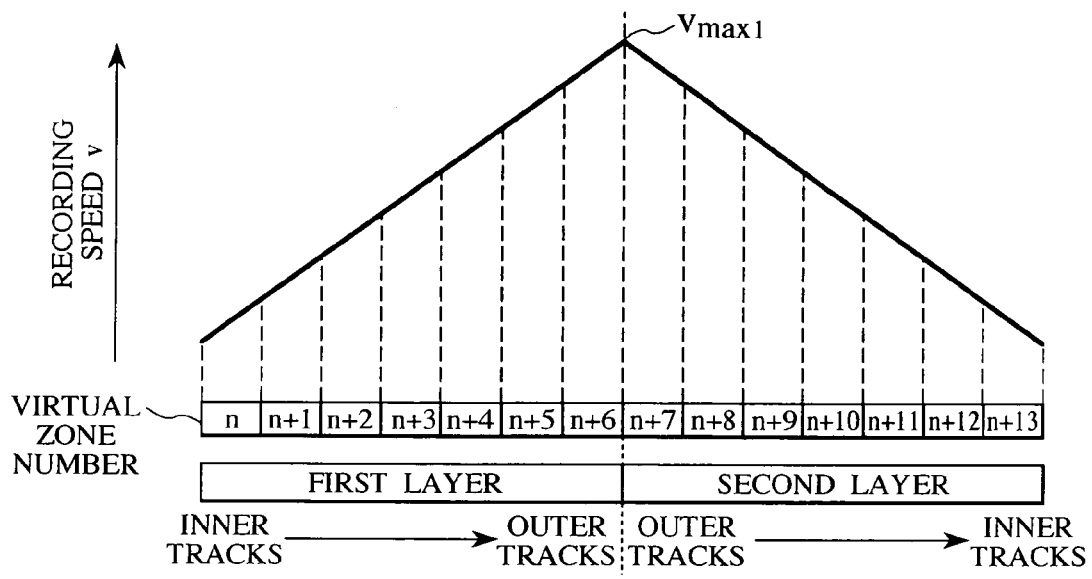
FIGS. 2A and 2B illustrate virtual zone setup.
Figure 2B:
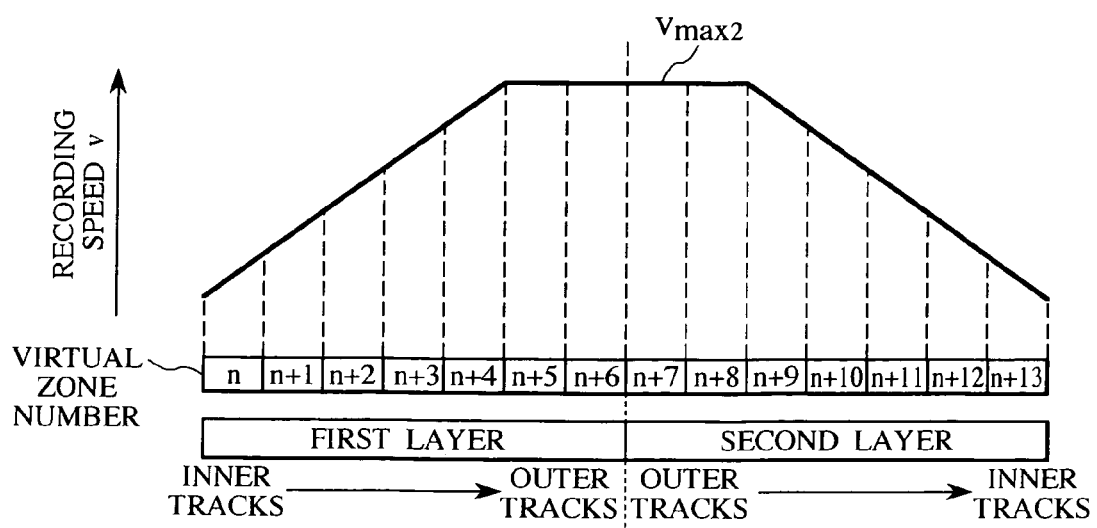
Figure 3:
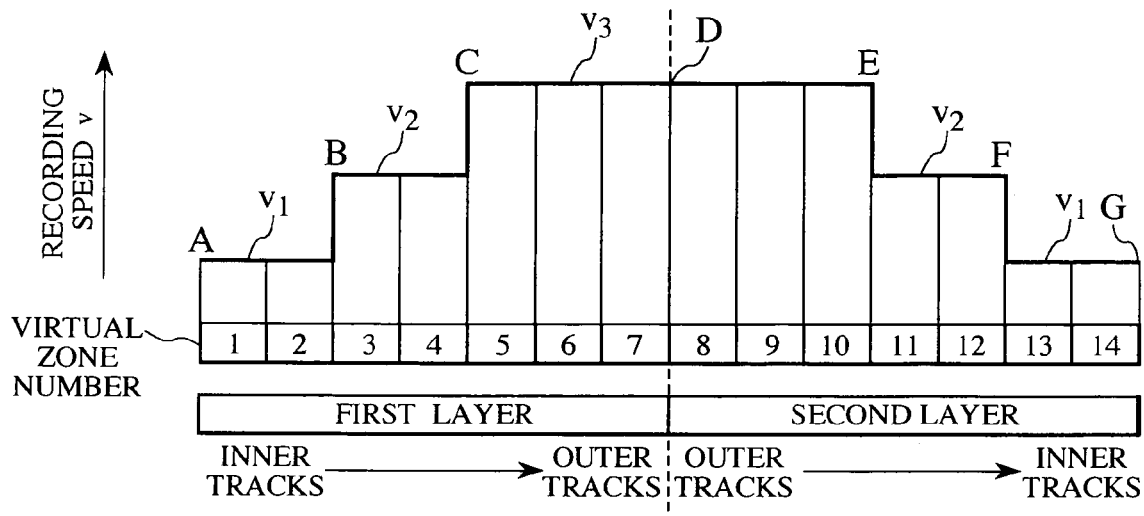
FIG. 3 illustrates the recording speed and virtual zones of the optical disc apparatus shown in FIG. 1.
Figure 4:
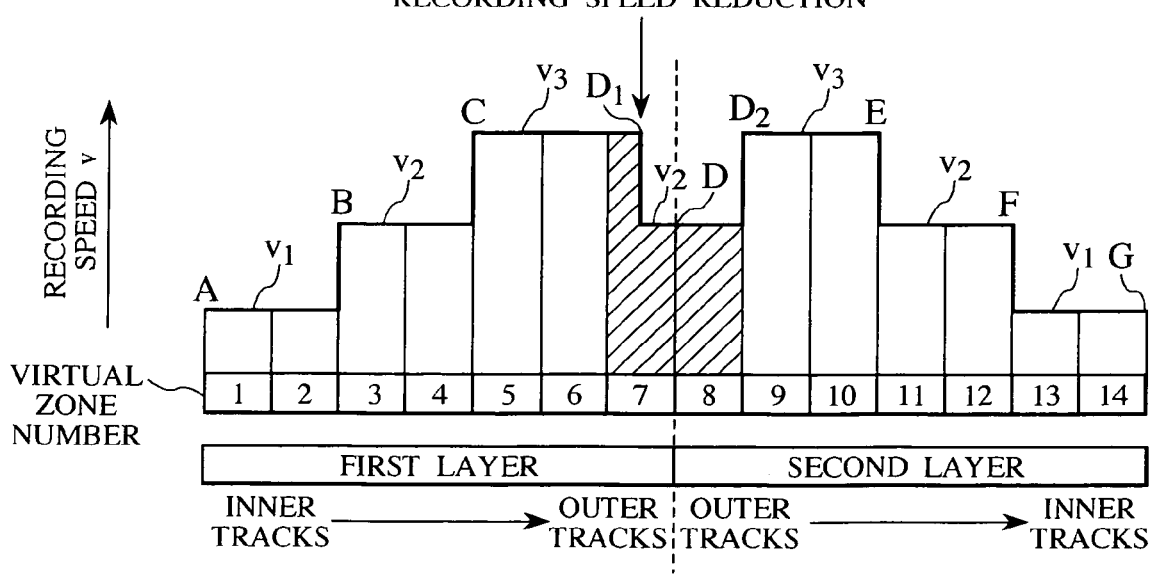
FIG. 4 shows a first example of recording speed control in the optical disc apparatus shown in FIG. 1.
Figure 5:
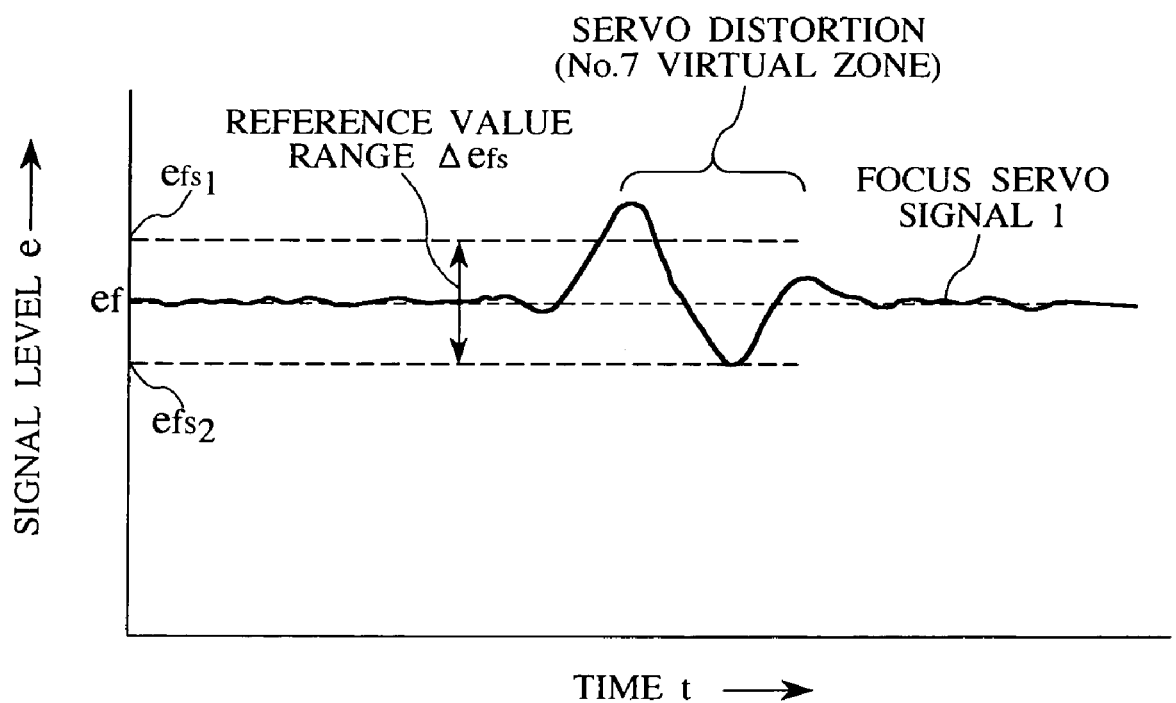
FIG. 5 shows an example of the waveform of a focus servo signal.
Figure 6:
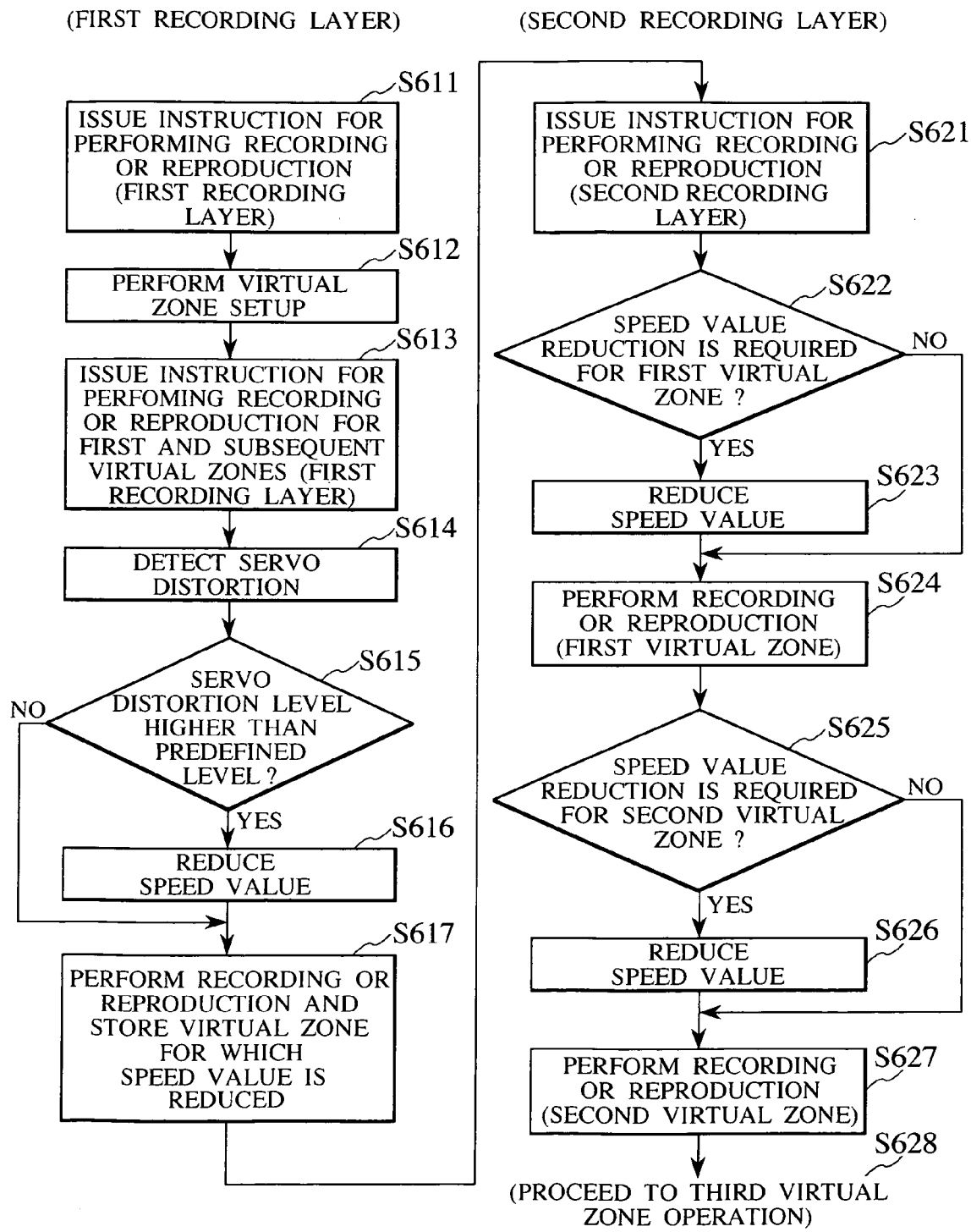
FIG. 6 illustrates an operation that is performed by the optical disc apparatus shown in FIG. 1.
Figure 7:
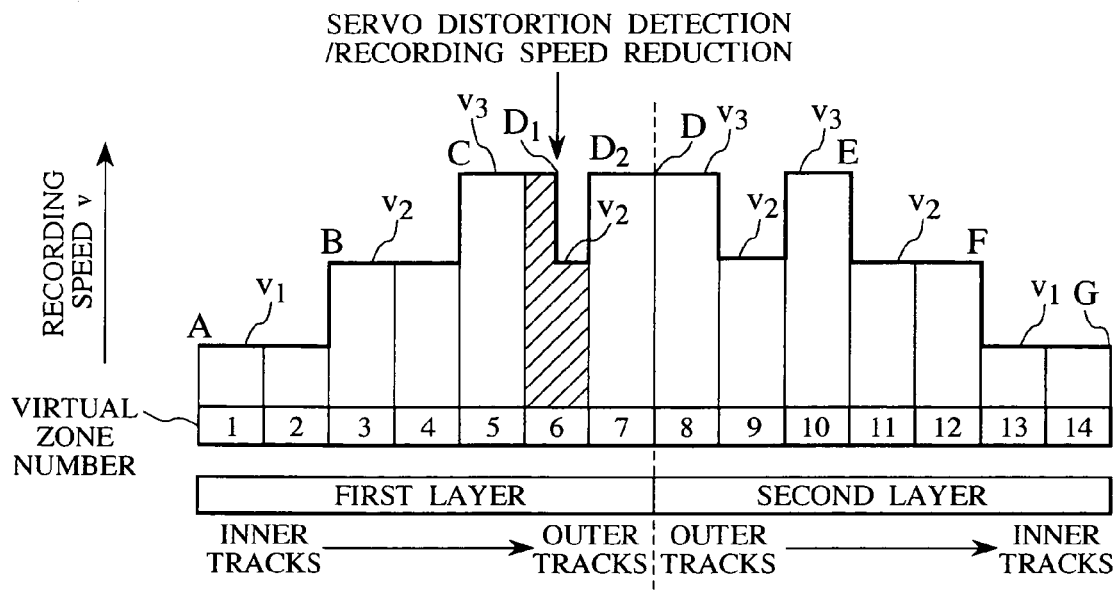
FIG. 7 shows a second example of recording speed control in the optical disc apparatus shown in FIG. 1.
Figure 8:
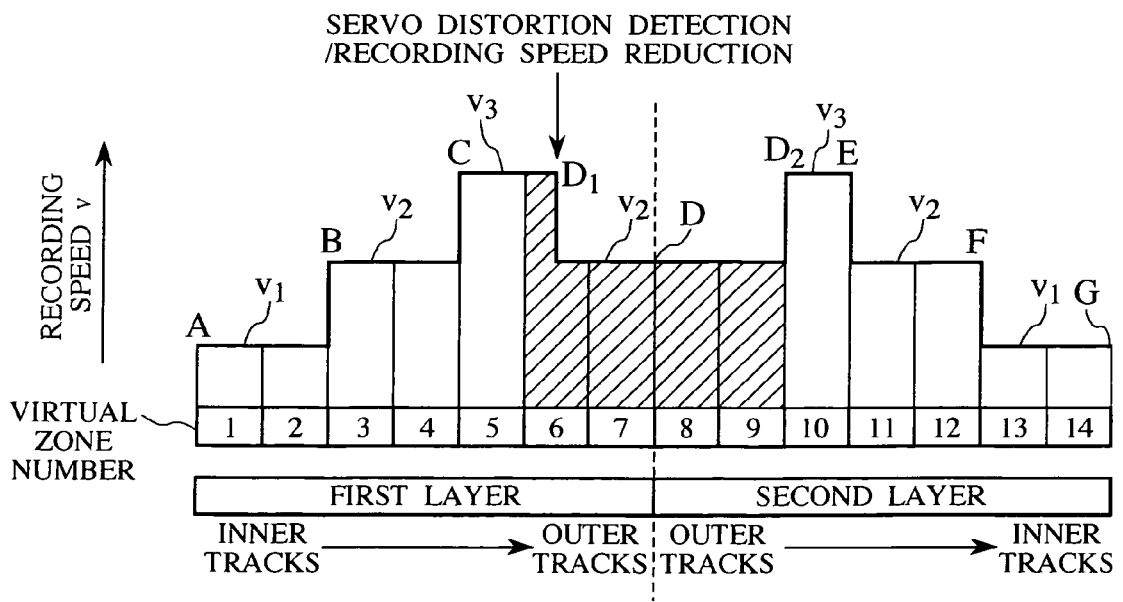
FIG. 8 shows a third example of recording speed control in the optical disc apparatus shown in FIG. 1.
Figure 11A:
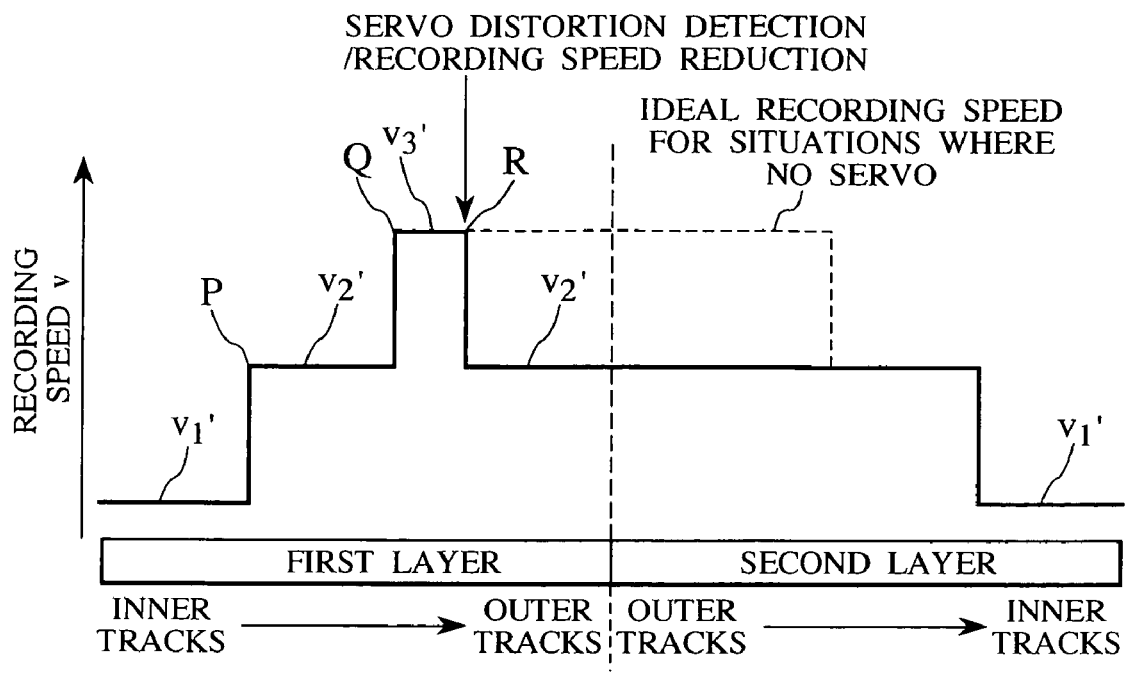
FIGS. 11A and 11B illustrate a conventional technology.
Figure 11B:
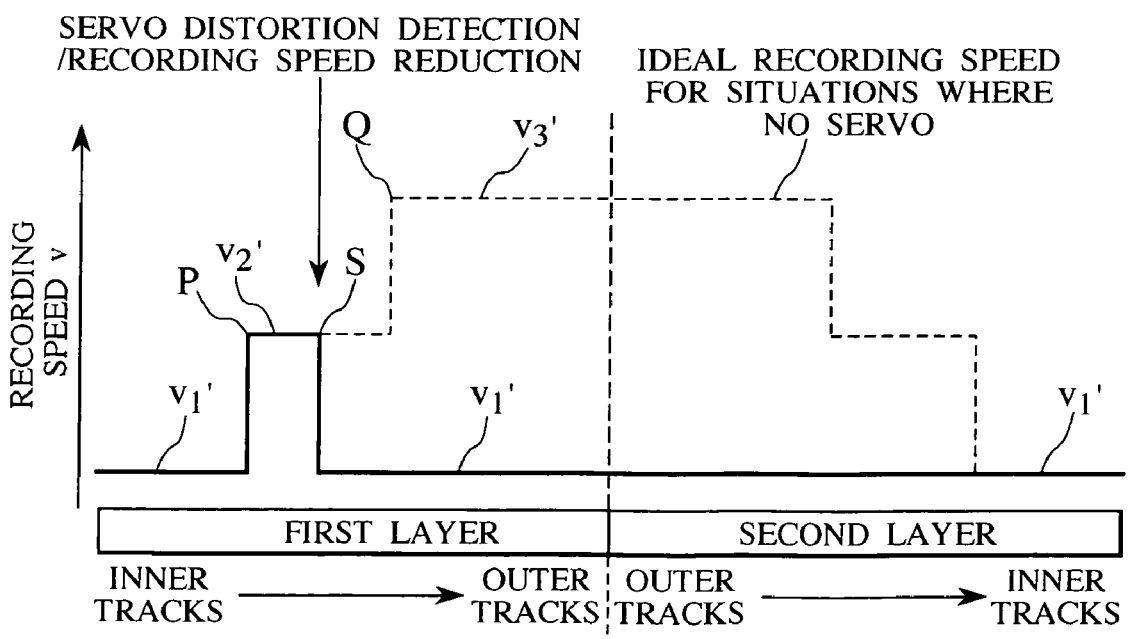

FIGS. 1 to 10 illustrate an embodiment of the present invention. FIG. 1 illustrates a configuration of an optical disc apparatus according to the embodiment of the present invention. FIGS. 2A and 2B illustrate virtual zone setup for the optical disc apparatus shown in FIG. 1. FIG. 3 illustrates virtual zones of the optical disc apparatus shown in FIG. 1 and three recording speed settings ($v_1$, $v_2$, and $v_3$). FIG. 4 shows a first example of recording speed control in the optical disc apparatus shown in FIG. 1. FIG. 5 shows an example of the waveform of a focus servo signal. FIG. 6 illustrates an operation that is performed by the optical disc apparatus shown in FIG. 1. FIG. 7 shows a second example of recording speed control in the optical disc apparatus shown in FIG. 1. FIG. 8 shows a third example of recording speed control in the optical disc apparatus shown in FIG. 1. FIG. 9 shows a fourth example of recording speed control in the optical disc apparatus shown in FIG. 1. FIG. 10 shows a fifth example of recording speed control in the optical disc apparatus shown in FIG. 1.

In FIG. 1, the reference numeral 1 denotes an optical disc apparatus according to the embodiment of the present invention; 2, a DVD±R disc or other optical disc having two recording layers; 3, a disc motor that rotates an optical disc 2; 4, an optical pickup; 5, an objective lens; 6, a laser diode that generates laser light having a predetermined intensity within the optical pickup 4 for recording/reproducing purposes; 7, a laser drive circuit for driving the laser diode 6 in the optical pickup 4; 8, a photodetector that is positioned within the optical pickup 4 to receive laser light, which is reflected from an optical disc recording surface (hereinafter referred to as the optical disc surface) via the objective lens 5, convert the received light to an electrical signal, and output the resulting electrical signal; 9, an actuator that is positioned within the optical pickup 4 to variously move the objective lens 5 relative to the optical disc surface or change the posture of the objective lens 5; 10, an actuator drive circuit for driving the actuator 9; 11, a movement/guide mechanism section that includes a linear guide member (not shown) and a lead screw member (not shown) and moves the optical pickup 4 in the substantially radial direction of the hybrid optical disc 2; 12, a slide motor that is positioned in the movement/guide mechanism section 11 to rotate the lead screw member (not shown); 15, a motor drive circuit for driving the disc motor 3 and slide motor 12; 30, a DSP (Digital Signal Processor); 31, a motor control section that is positioned within the DSP 30 to serve as a motor controller for controlling the motor drive circuit 15; 32, a recording signal generation section for generating a recording signal; 33, a reproduction/error signal processing section that is positioned within the DSP 30 to receive a reproduction signal from the photodetector 8 and process the received signal as an RF signal, as a tracking error signal, which serves as a tracking servo signal, or as a focus error signal, which serves as a focus servo signal; 34, a focus/tracking control section that is positioned within the DSP 30 to generate and output a focus control signal and tracking control signal for controlling the actuator drive circuit 10; 35, a servo distortion detection section that serves as distortion detector for detecting a signal distortion in a tracking error signal, which serves as a tracking servo signal, and in a focus error signal, which serves as a focus servo signal; 40, a microcomputer that serves as a controller for controlling the DSP 30; and 50, a memory, which serves as a storage section for storing information data that the microcomputer 40 processes or information data processed by the microcomputer 40.

The servo distortion detection section 35, which serves as distortion detector, compares a distortion in a tracking error signal or focus error signal with a predefined reference value. When the distortion exceeds the reference value, the servo distortion detection section 35 outputs a detection signal for the distortion. The microcomputer 40, which serves as a controller, sets a plurality of virtual zones corresponding to a plurality of zones arranged in the radial direction of the optical disc 2 for two recording layers (first and second recording layers) of the optical disc 2, controls the motor control section 31 on an individual virtual zone basis in accordance with the output from the servo distortion detection section 35, further controls the rotation speed of the disc motor 3, and further controls the rotation speed of the optical disc 2. The microcomputer 40 also sets the above-mentioned virtual zones so that a plurality of virtual zones corresponding to one of the two recording layers of the optical disc 2 (first recording layer) and a plurality of virtual zones corresponding to the other recording layer (second recording layer) are in the same disc radial positions. Further, when control is exercised to change the rotation speed of the optical disc 2 to a low speed in a virtual zone on the first recording layer side, the microcomputer 40 stores the virtual zone of the first recording layer, in which the change is made, in the memory 50 which serves as the storage section, as the change information. If a recording or reproducing operation is to be performed in relation to a virtual zone that is on the second recording layer side, that is, the virtual zone on the second recording layer side and positioned in the same disc radial position as a virtual zone on the first recording layer side, in which the change is made, the microcomputer 40 reads the virtual zone stored in the memory 50, changes the rotation speed of the optical disc 2 in the associated virtual zone on the second recording layer side to a low speed, and starts a recording or reproducing operation at the selected low speed of the rotation speed prior to the recording or reproducing operation. If a recording or reproducing operation is to be performed in relation to each virtual zone of the second recording layer of the optical disc 2, the microcomputer 40 judges whether the rotation speed of the optical disc 2 is changed to a low speed in a virtual zone of the first recording layer that corresponds to the virtual zone to be recorded or reproduced (or is positioned in the same disc radial position), based on the change information stored in the memory 50, that is, the information indicating whether a stored virtual zone exists, prior to the recording or reproducing operation. If the obtained judgment result indicates that there is a corresponding virtual zone of the first recording layer (or there is a virtual zone that is in the same disc radial position), the microcomputer 40 switches the rotation speed of the optical disc 2 to a low speed in the virtual zone on the second recording layer side to be recorded or reproduced. On the other hand, if the obtained judgment result indicates that there is no corresponding virtual zone of the first recording layer, the microcomputer 40 does not switch the rotation speed of the optical disc 2 to a low speed.

The reference numerals assigned to the elements of the optical disc apparatus shown in FIG. 1 for explanation purposes are the same as those in FIG. 1.

FIGS. 2A and 2B illustrate virtual zone setup for the optical disc apparatus shown in FIG. 1. FIG. 2A shows a case where the optical disc 2 rotates according to a CAV method (constant angular velocity method). FIG. 2B shows a case where the optical disc rotates according to a PCAV method in which the optical disc 2 rotates according to the CAV method for some zones of the optical disc 2. In both cases, the microcomputer 40 sets seven virtual zones, which are indicated from inner tracks to outer tracks of the disc, No. n, No. (n+1), No. (n+2), No. (n+3), No. (n+4), No. (n+5), and No. (n+6), for the first recording layer of the optical disc 2 (first layer); and the microcomputer 40 sets seven virtual zones, which are indicated from outer tracks to inner tracks of the disc, No. (n+7), No. (n+8), No. (n+9), No. (n+10), No. (n+11), No. (n+12), and No. (n+14), for the second recording layer of the optical disc 2 (first layer). The No. n and No. (n+13) virtual zones are set in the same disc radial position. The No. (n+1) and No. (n+12) virtual zones are set in the same disc radial position. The No. (n+2) and No. (n+11) virtual zones are set in the same disc radial position. The No. (n+3) and No. (n+10) virtual zones are set in the same disc radial position. The No. (n+4) and No. (n+9) virtual zones are set in the same disc radial position. The No. (n+5) and No. (n+8) virtual zones are set in the same disc radial position. The No. (n+6) and No. (n+7) virtual zones are set in the same disc radial position. When the CAV method shown in FIG. 2A is used, the maximum recording speed $v_{max}$ prevails at the ends of the No. (n+6) and No. (n+7) virtual zones, which are the outermost virtual zones. When the PCAV method shown in FIG. 2B is used, on the other hand, the maximum recording speed $v_{max2}$ prevails in the No. (n+5) and No. (n+6) virtual zones and No. (n+7) and No. (n+8) virtual zones, which are outer virtual zones.

FIG. 3 illustrates a case where seven virtual zones are set for both the first recording layer (first layer) and second recording layer (second layer) of the optical disc apparatus 1 shown in FIG. 1, that is, a total of fourteen virtual zones are set, the optical disc 2 is rotated according to a ZCLV method, and three recording speeds ($v_1$, $v_2$, and $v_3$ ($v_1<v_2<v_3$)) are employed.

As indicated in FIG. 3, the microcomputer 40 sets seven virtual zones (No. 1 to No. 7 virtual zones) for the first recording layer (first layer) of the optical disc 2 from inner tracks to outer tracks of the disc, and sets seven virtual zones (No. 8 to No. 14 virtual zones) for the second recording layer (second layer) of the optical disc 2 from outer tracks to inner tracks of the disc. The No. 1 virtual zone of the first recording layer and the No. 14 virtual zone of the second recording layer are set in the same disc radial position with the recording speed set to $v_1$. The No. 2 virtual zone of the first recording layer and the No. 13 virtual zone of the second recording layer are set in the same disc radial position with the recording speed set to $v_1$. The No. 3 virtual zone of the first recording layer and the No. 12 virtual zone of the second recording layer are set in the same disc radial position with the recording speed set to $v_2$. The No. 4 virtual zone of the first recording layer and the No. 11 virtual zone of the second recording layer are set in the same disc radial position with the recording speed set to $v_2$. The No. 5 virtual zone of the first recording layer and the No. 10 virtual zone of the second recording layer are set in the same disc radial position with the recording speed set to $v_3$. The No. 6 virtual zone of the first recording layer and the No. 9 virtual zone of the second recording layer are set in the same disc radial position with the recording speed set to $v_3$. The No. 7 virtual zone of the first recording layer and the No. 8 virtual zone of the second recording layer are set in the same disc radial position with the recording speed set to $v_3$. The letter A denotes a disc inner end position of the No. 1 virtual zone. The letter B denotes a disc inner end position of the No. 3 virtual zone. The letter C denotes a disc inner end position of the No. 5 virtual zone. The letter D denotes a boundary position between the No. 7 virtual zone and No. 8 virtual zone. The letter E denotes a disc outer end position of the No. 10 virtual zone. The letter F denotes a disc outer end position of the No. 12 virtual zone. The letter G denotes a disc outer end position of the No. 14 virtual zone.

FIGS. 4, 7, 8, 9, and 10 illustrate situations where the recording speed v in the state shown in FIG. 3 is varied.

FIG. 4 shows a first example of recording speed control in the optical disc apparatus 1 shown in FIG. 1. FIG. 4 shows how the recording speed v changes when a servo signal distortion is detected in a virtual zone of the first recording layer at a recording speed of $v_3$ shown in FIG. 3 and the recording speed is reduced based on the detection.

Referring to FIG. 4, if the servo distortion detection section 35 detects, at a position $D_1$, a tracking error signal or focus error signal distortion, which are servo signals, greater than the reference value while a recording or reproducing operation is performed in the No. 7 virtual zone of the first recording layer, the microcomputer 40 controls the motor control section 31 of the DSP 30, instructs the motor drive circuit 15 to reduce the rotation speed of the disc motor 3, and changes the optical disc 2 from a rotation speed state corresponding to recording speed $v_3$ to a rotation speed state corresponding to recording speed $v_2$. In this instance, the microcomputer 40 stores in the memory the change information indicating that the rotation speed of the optical disc 2 is changed to a low speed in the No. 7 virtual zone of the first recording layer, that is, the recording speed is reduced. In the No. 7 virtual zone after the position $D_1$ is reached, a recording or reproducing operation is performed with the optical disc 2 placed in a rotation speed state corresponding to recording speed $v_2$.

When a position D is reached after a recording or reproducing operation in the No. 7 virtual zone is terminated, the microcomputer 40 judges whether or not the rotation speed of the optical disc 2 is reduced in the No. 7 virtual zone of the first recording layer, which corresponds to (which is in the same disc radial position as) the No. 8 virtual zone, based on the information stored in the memory 50, before a recording or reproducing operation is performed in the No. 8 virtual zone of the second recording layer. In accordance with the obtained judgment result, the microcomputer 40 presets the rotation speed of the optical disc 2 for the No. 8 virtual zone of the second recording layer. In the example shown in FIG. 4, the rotation speed of the optical disc 2 is changed to a low speed in the No. 7 virtual zone of the first recording layer as described above. Thus, the above judgment result also indicates that the rotation speed is changed to a low speed in the No. 7 virtual zone. The microcomputer 40 controls the motor control section 31 of the DSP 30 in accordance with the judgment result to control the rotation speed of the disc motor 3, and sets the rotation speed of the optical disc 2 to a rotation speed that corresponds to recording speed $v_2$. In other words, the optical disc 2 is set to the same rotation speed as the rotation speed reduced in the No. 7 virtual zone after the position $D_1$ is reached (the rotation speed corresponding to recording speed $v_2$) before a recording or reproducing operation is performed in the No. 8 virtual zone of the second recording layer. After completion of such setup, the microcomputer 40 performs a recording or reproducing operation in the No. 8 virtual zone.

When position $D_2$ is reached upon completion of the recording or reproducing operation in the No. 8 virtual zone, the microcomputer 40 judges whether or not the rotation speed of the optical disc 2 is reduced in the No. 6 virtual zone of the first recording layer, which corresponds to (which is in the same disc radial position as) the No. 9 virtual zone, based on the information stored in the memory 50, before a recording or reproducing operation is performed in the next virtual zone (No. 9 virtual zone). In accordance with the obtained judgment result, the microcomputer 40 presets the rotation speed of the optical disc 2 for the No. 9 virtual zone of the second recording layer. In the No. 6 virtual zone of the first recording layer shown in FIG. 4, the rotation speed of the optical disc 2 corresponds to recording speed $v_3$. Thus, the above judgment result indicates that the rotation speed is not changed to a low speed in the No. 6 virtual zone. The microcomputer 40 controls the motor control section 31 of the DSP 30 in accordance with the judgment result to control the rotation speed of the disc motor 3, and sets the rotation speed of the optical disc 2 to a rotation speed that corresponds to recording speed $v_3$. In other words, the optical disc 2 is set to the same rotation speed as the rotation speed for the No. 6 virtual zone (the rotation speed corresponding to recording speed $v_3$) before a recording or reproducing operation is performed in the No. 9 virtual zone of the second recording layer. After completion of such setup, the microcomputer 40 controls the motor control section 31 to rotate the optical disc 2 at the selected rotation speed and perform a recording or reproducing operation in the No. 9 virtual zone.

When a position at which the recording or reproducing operation is terminated in the No. 9 virtual zone is reached, the microcomputer 40 judges whether or not the rotation speed of the optical disc 2 is reduced in the No. 5 virtual zone of the first recording layer, which corresponds to (is in the same disc radial position as) the No. 10 virtual zone based on the information stored in the memory 50 before a recording or reproducing operation in the next virtual zone (No. 10 virtual zone). In accordance with the obtained judgment result, the microcomputer 40 presets the rotation speed of the optical disc 2 for the No. 10 virtual zone of the second recording layer. Next, the microcomputer 40 performs control for the No. 10 virtual zone in the same manner as for the No. 9 virtual zone, sets the optical disc 2 to a rotation speed corresponding to recording speed $v_3$, and performs a recording or reproducing operation in the No. 10 virtual zone.

For the No. 11 to No. 15 virtual zones, the microcomputer 40 exercises control in the same manner as for the No. 9 and No. 10 virtual zones, rotates the optical disc 2 at a rotation speed corresponding to recording speed $v_2$ or $v_1$, and enables the optical disc apparatus to perform a recording or reproducing operation.

FIG. 5 shows an example of the waveform of a focus servo signal that contains a distortion.

In FIG. 5, $e_f$ denotes a focus servo signal level prevailing when no distortion exists (hereinafter referred to as the steady-state level); $e_{fs1}$, a focus servo signal upper reference value for a situation where the focus servo signal is found to be distorted; $e_{fs2}$, a focus servo signal lower reference value for a situation where the focus servo signal is found to be distorted; and $\Delta e_{fs}$, the difference between the upper reference value $e_{fs1}$ and the lower reference value $e_{fs2}$ (hereinafter referred to as the reference value range). The upper reference value $e_{fs1}$, lower reference value $e_{fs2}$, and reference value range $\Delta e_{fs}$ are set in the servo distortion detection section 35 of the DSP 30. The waveform shown in FIG. 5 indicates that the upper reference value $e_{fs1}$ and lower reference value $e_{fs2}$ are both exceeded by the level prevailing at the time of focus servo signal distortion, and that the level of the distortion is outside the reference value range $\Delta e_{fs}$. Therefore, the servo distortion detection section 35 outputs a signal as a detection result based on the focus servo signal distortion, and the microcomputer 40 controls the motor control section 31 in accordance with the detection result to reduce the rotation speed of the optical disc 2, and makes the memory 50 store the prevailing virtual zone information. FIG. 4 indicates that the distortion shown in FIG. 5 occurred when a recording or reproducing operation was performed in the No. 7 virtual zone of the first recording layer.

FIG. 6 illustrates an operation that is performed by the optical disc apparatus shown in FIG. 1.

The following steps are performed as indicated in FIG. 6:

(1) The optical disc apparatus receives an instruction for performing a recording or reproducing operation in relation to the first recording layer (step S611).

(2) The microcomputer 40 performs virtual zone setup for the first and second recording layers of the optical disc 2 (step S612).

(3) The microcomputer 40 issues an instruction for performing a recording or reproducing operation in relation to the first virtual zone of the first recording layer of the optical disc 2 (step S613).

(4) The servo distortion detection section 35 detects a distortion (servo distortion) from the focus error signal (focus servo signal) or tracking error signal (tracking servo signal) (step S614). In the example shown in FIG. 4, the servo distortion is detected when a recording or reproducing operation is performed in the No. 7 virtual zone.

(5) The servo distortion detection section 35 judges whether the detected servo distortion is greater than a preset reference value (step S615).

(6) If the judgment result obtained in step S615 indicates that the servo distortion is greater than the preset reference value, the microcomputer 40 controls the motor control section 31 to make the motor drive circuit 15 reduce the rotation speed of the disc motor 3, thereby decreasing the rotation speed of the optical disc (step S616). In the example shown in FIG. 4, in the No. 7 virtual zone, the rotation speed of the optical disc 2 is decreased from a rotation speed corresponding to the recording speed $v_3$ to a rotation speed corresponding to the recording speed $v_2$.

(7) The microcomputer 40 performs a recording or reproducing operation relative to the optical disc 2 at the decreased rotation speed, and causes the memory 50 to store the virtual zone in which the rotation speed was decreased (step S617). In the example shown in FIG. 4, the memory 50 stores the No. 7 virtual zone.

(8) The optical disc apparatus 1 receives an instruction for performing a recording or reproducing operation in relation to the second recording layer (step S621).

(9) The microcomputer 40 judges whether it is necessary to decrease the recording speed by reducing the rotation speed of the optical disc 2 in a virtual zone of the second recording layer in which a recording or reproducing operation is to be performed (first virtual zone). The microcomputer 40 performs this judgment step based on the information stored in the memory 50, that is, the information indicating whether the rotation speed of the optical disc 2 has been reduced in a virtual zone on the first recording layer side that corresponds to the first virtual zone (step S622). In the example shown in FIG. 4, it is judged whether it is necessary to reduce the rotation speed of the optical disc 2 for the No. 8 virtual zone, which is the first virtual zone of the second recording layer, in accordance with the information indicating whether the rotation speed of the optical disc 2 has been reduced in the No. 7 virtual zone on the first recording layer side.

(10) If the judgment result obtained in step S622 indicates that the rotation speed of the optical disc 2 needs to be reduced, the microcomputer controls the motor control section 31 of the DSP 30 to decrease the rotation speed of the optical disc 2 to a predetermined value (step S623) before a recording or reproducing operation is performed. In the example shown in FIG. 4, the rotation speed of the optical disc 2 for the No. 8 virtual zone is set to a rotation speed corresponding to the recording speed $v_2$.

(11) While the optical disc 2 rotates at the above-mentioned reduced rotation speed, a recording or reproducing operation is performed in relation to the first virtual zone of the second recording layer (step S624).

(12) If the judgment result obtained in step S622 does not indicate that the rotation speed of the optical disc 2 needs to be reduced, the microcomputer 40 controls the motor control section 31 of the DSP 30 not to reduce the rotation speed of the optical disc 2 and places the apparatus into a recording or reproducing state.

(13) Before a recording or reproducing operation is performed in relation to the second virtual zone of the second recording layer, it is judged whether it is necessary to decrease the recording speed by reducing the rotation speed of the optical disc 2 (step S625), based on the information stored in the memory 50, that is, the information indicating whether the rotation speed of the optical disc 2 has been reduced in a virtual zone on the first recording layer side that corresponds to the second virtual zone. In the example shown in FIG. 4, based on the information indicating whether the rotation speed of the optical disc 2 has been reduced for the No. 6 virtual zone on the first recording layer side, it is judged whether it is necessary to reduce the rotation speed of the optical disc 2 for the No. 9 virtual zone of the second recording layer.

(14) If the judgment result obtained in step S625 indicates that the rotation speed of the optical disc 2 needs to be reduced, the microcomputer 40 controls the motor control section 31 of the DSP 30 to reduce the rotation speed of the optical disc 2 to a predetermined value (step S626) before a recording or reproducing operation is performed. In the example shown in FIG. 4, the information indicating whether the rotation speed of the optical disc 2 has been reduced in the No. 6 virtual zone on the first recording layer side does not exist; therefore, the microcomputer 40 does not reduce the rotation speed of the optical disc 2 in the No. 9 virtual zone.

(15) A recording or reproducing operation is performed for the second virtual zone of the second recording layer at a rotation speed of the optical disc 2, which is based on the judgment result obtained in step S625 (step S627).

(16) The microcomputer 40 proceeds to exercise control in the third virtual zone of the second recording layer (step S628).

Steps S611 to S617 and steps S621 to S628 are automatically performed by the microcomputer 40 in accordance with a program that is stored in the memory 50 or other storage section within the optical disc apparatus 1.

FIG. 7 shows a second example of recording speed control in the optical disc apparatus 1 shown in FIG. 1. FIG. 7 shows how the recording speed changes when a servo signal distortion is detected in a virtual zone with a recording speed of $v_3$ of the first recording layer shown in FIG. 3, and when the recording speed is reduced accordingly.

Referring to FIG. 7, if the servo distortion detection section 35 detects a distortion in a tracking error signal (servo signal) or focus error signal (servo signal) that is greater than the reference value at a position $D_1$ while a recording or reproducing operation is performed in the No. 6 virtual zone of the first recording layer, the microcomputer 40 changes the optical disc 2 from a rotation speed state corresponding to recording speed $v_3$ to a rotation speed state corresponding to recording speed $v_2$. In this instance, the microcomputer 40 stores in the memory 50 the change information indicating that the rotation speed of the optical disc 2 is changed to a low speed in the No. 6 virtual zone of the first recording layer, that is, the recording speed is reduced. In the No. 6 virtual zone after the position $D_1$ is reached, a recording or reproducing operation is performed with the optical disc 2 placed in a rotation speed state corresponding to recording speed $v_2$.

When a position $D_2$ is reached after a recording or reproducing operation is terminated in the No. 6 virtual zone of the first recording layer, the microcomputer 40 causes the rotation speed of the optical disc 2 to revert to a rotation speed corresponding to recording speed $v_3$ before a recording or reproducing operation is performed in the No. 7 virtual zone within the first recording layer. Subsequently, a recording or reproducing operation is performed in the No. 7 virtual zone with the optical disc 2 placed in a rotation speed state corresponding to recording speed $v_3$. When the position D is reached after a recording or reproducing operation is terminated in the No. 7 virtual zone of the first recording layer, the microcomputer 40 judges whether the rotation speed of the optical disc 2 is reduced in the No. 7 virtual zone of the first recording layer, which corresponds to (which is in the same disc radial position as) the No. 8 virtual zone, based on the information stored in the memory 50 before a recording or reproducing operation is performed in the No. 8 virtual zone within the second recording layer. In accordance with the obtained judgment result, the microcomputer 40 presets the rotation speed of the optical disc 2 for the No. 8 virtual zone of the second recording layer. In the example shown in FIG. 7, the rotation speed of the optical disc 2 is not changed to a low speed in the No. 7 virtual zone of the first recording layer as described above. Thus, the above judgment result also indicates that the rotation speed is not changed to a low speed in the No. 7 virtual zone. In accordance with the judgment result, the microcomputer 40 sets the rotation speed of the optical disc 2 to a rotation speed that corresponds to recording speed $v_3$. After completion of such setup, the microcomputer 40 performs a recording or reproducing operation in the No. 8 virtual zone.

When a recording or reproducing operation is terminated in the No. 8 virtual zone, the microcomputer 40 judges whether the rotation speed of the optical disc 2 is reduced in the No. 6 virtual zone of the first recording layer, which corresponds to (is in the same disc radial position as) the No. 9 virtual zone based on the information stored in the memory 50 before a recording or reproducing operation in the next virtual zone (No. 9 virtual zone). In accordance with the obtained judgment result, the microcomputer 40 presets the rotation speed of the optical disc 2 for the No. 9 virtual zone of the second recording layer. In the example shown in FIG. 7, the rotation speed of the optical disc 2 is reduced to a rotation speed corresponding to recording speed $v_2$ in the No. 6 virtual zone of the first recording layer. Thus, the above judgment result indicates that the rotation speed is changed to a low speed in the No. 6 virtual zone. In accordance with the judgment result, the microcomputer 40 controls the motor control section 31 of the DSP 30 to control the rotation speed of the disc motor 3, and sets the rotation speed of the optical disc 2 for the No. 9 virtual zone to a rotation speed that corresponds to recording speed $v_2$. That is, the optical discs 2 is set to the same rotation speed as the rotation speed for the No. 6 virtual zone of the first recording layer (the rotation speed corresponding to recording speed $v_2$) before a recording or reproducing operation is performed in the No. 9 virtual zone of the second recording layer. After completion of such setup, the microcomputer 40 controls the motor control section 31 to rotate the optical disc 2 at the selected rotation speed and perform a recording or reproducing operation in the No. 9 virtual zone.

When a position at which the recording or reproducing operation is terminated in the No. 9 virtual zone is reached, the microcomputer 40 judges whether the rotation speed of the optical disc 2 is reduced in the No. 5 virtual zone of the first recording layer, which corresponds to (is in the same disc radial position as) the No. 10 virtual zone, based on the information stored in the memory 50 before a recording or reproducing operation in the next virtual zone (No. 10 virtual zone). In accordance with the obtained judgment result, the microcomputer 40 presets the rotation speed of the optical disc 2 for the No. 10 virtual zone of the second recording layer. Subsequently, the microcomputer 40 exercises control in the No. 10 virtual zone in the same manner as for the No. 8 virtual zone, causes the optical disc 2 to revert to the rotation speed corresponding to recording speed $v_3$, and performs a recording or reproducing operation.

For the No. 11 to No. 15 virtual zones, control is exercised in the same manner as for the No. 8 and No. 10 virtual zones to rotate the optical disc 2 at a rotation speed corresponding to recording speed $v_2$ or $v_1$ and perform a recording or reproducing operation.

FIG. 8 shows a third example of the recording speed control in the optical disc apparatus 1 shown in FIG. 1. It shows how the recording speed changes when a servo signal distortion is detected in a virtual zone with a recording speed of $v_3$ of the first recording layer shown in FIG. 3, the recording speed is reduced accordingly, and the recording speed is maintained in the first recording layer after the recording speed is reduced.

Referring to FIG. 8, if the servo distortion detection section 35 detects a distortion in a tracking error signal (servo signal) or focus error signal (servo signal) that is greater than the reference value at the position $D_1$ while a recording or reproducing operation is performed in the No. 6 virtual zone of the first recording layer, the microcomputer 40 changes the optical disc 2 from a rotation speed state corresponding to recording speed $v_3$ to a rotation speed state corresponding to recording speed $v_2$. In this instance, the microcomputer 40 stores the information about the No. 6 virtual zone in the memory 50, and performs a recording or reproducing operation in the No. 6 virtual zone after the position $D_1$ is reached with the optical disc 2 placed in a rotation speed state corresponding to recording speed $v_2$.

When switching to the No. 7 virtual zone after completion of a recording or reproducing operation in the No. 6 virtual zone of the first recording layer, the microcomputer 40 maintains the rotation speed of the optical disc 2 that corresponds to recording speed $v_2$, and performs a recording or reproducing operation in the No. 7 virtual zone. The microcomputer 40 also stores the information about the No. 7 virtual zone in the memory 50. When the position D is reached after a recording or reproducing operation is terminated in the No. 7 virtual zone of the first recording layer, the microcomputer 40 judges whether the rotation speed of the optical disc 2 is reduced in the No. 7 virtual zone of the first recording layer, which corresponds to (is in the same disc radial position as) the No. 8 virtual zone, based on the information stored in the memory 50 before a recording or reproducing operation in the No. 8 virtual zone within the second recording layer. In accordance with the obtained judgment result, the microcomputer 40 presets the rotation speed of the optical disc 2 for the No. 8 virtual zone of the second recording layer to a rotation speed that corresponds to recording speed $v_2$. After completion of such setup, the microcomputer 40 performs a recording or reproducing operation in the No. 8 virtual zone.

When the recording or reproducing operation is terminated in the No. 8 virtual zone, the microcomputer 40 judges whether the rotation speed of the optical disc 2 is reduced in the No. 6 virtual zone of the first recording layer, which corresponds to (is in the same disc radial position as) the No. 9 virtual zone, based on the information stored in the memory 50 before a recording or reproducing operation in the next virtual zone (No. 9 virtual zone). In accordance with the obtained judgment result, the microcomputer 40 presets the rotation speed of the optical disc 2 for the No. 9 virtual zone of the second recording layer to a rotation speed that corresponds to recording speed $v_2$. After completion of such setup, the microcomputer 40 rotates the optical disc 2 at the selected rotation speed to perform a recording or reproducing operation in the No. 9 virtual zone. The operations performed in the No. 10 to No. 15 virtual zones are the same as those described with reference to FIGS. 4 and 7.

FIG. 9 shows a fourth example of the recording speed control in the optical disc apparatus shown in FIG. 1. It shows how the recording speed changes when a servo signal distortion is detected in two virtual zones with a recording speed of $v_3$ of the first recording layer shown in FIG. 3.

Referring to FIG. 9, if the servo distortion detection section 35 detects a servo signal distortion greater than the reference value at position $D_1$ while a recording or reproducing operation is performed in the No. 6 virtual zone of the first recording layer, the microcomputer 40 changes the optical disc 2 from a rotation speed state corresponding to recording speed $v_3$ to a rotation speed state corresponding to recording speed $v_2$. In this instance, the microcomputer 40 stores the information about the No. 6 virtual zone in the memory 50, and performs a recording or reproducing operation in the No. 6 virtual zone after position $D_1$ is reached with the optical disc 2 placed in a rotation speed state corresponding to recording speed $v_2$.

When switching to the No. 7 virtual zone after completion of a recording or reproducing operation in the No. 6 virtual zone of the first recording layer, the microcomputer 40 maintains the rotation speed of the optical disc 2 that corresponds to recording speed $v_2$, and performs a recording or reproducing operation in the No. 7 virtual zone. If the servo distortion detection section 35 detects a servo signal distortion greater than the reference value again at the position $D_2$ while a recording or reproducing operation is performed in the No. 7 virtual zone, the microcomputer 40 changes the optical disc 2 from a rotation speed state corresponding to recording speed $v_2$ to a rotation speed state corresponding to recording speed $v_1$. In this instance, the microcomputer 40 stores the information about the No. 6 virtual zone in the memory 50, and performs a recording or reproducing operation in the No. 7 virtual zone after the position $D_2$ is reached with the optical disc 2 placed in a rotation speed state corresponding to recording speed $v_2$. When a position D is reached after a recording or reproducing operation is terminated in the No. 7 virtual zone of the first recording layer, the microcomputer 40 judges whether the rotation speed of the optical disc 2 is reduced to a rotation speed corresponding to recording speed $v_1$ in the No. 7 virtual zone of the first recording layer, which corresponds to (is in the same disc radial position as) the No. 8 virtual zone, based on the information stored in the memory 50 before a recording or reproducing operation is performed in the No. 8 virtual zone within the second recording layer. In accordance with the obtained judgment result, the microcomputer 40 presets the rotation speed of the optical disc 2 for the No. 8 virtual zone of the second recording layer to a rotation speed that corresponds to recording speed $v_1$. After completion of such setup, the microcomputer 40 performs a recording or reproducing operation in the No. 8 virtual zone.

When the recording or reproducing operation is terminated in the No. 8 virtual zone, the microcomputer 40 judges whether the rotation speed of the optical disc 2 is reduced to a rotation speed corresponding to recording speed $v_2$ in the No. 6 virtual zone of the first recording layer, which corresponds to (is in the same disc radial position as) the No. 9 virtual zone, based on the information stored in the memory 50 before a recording or reproducing operation is performed in the next virtual zone (No. 9 virtual zone). In accordance with the obtained judgment result, the microcomputer 40 presets the rotation speed of the optical disc 2 for the No. 9 virtual zone of the second recording layer to a rotation speed that corresponds to recording speed $v_2$. After completion of such setup, the microcomputer 40 rotates the optical disc 2 at the selected rotation speed to perform a recording or reproducing operation in the No. 9 virtual zone. The operations performed in the No. 10 to No. 15 virtual zones are the same as those described with reference to FIGS. 4, 7, and 8.

FIG. 10 shows a fifth example of the recording speed control in the optical disc apparatus shown in FIG. 1. It shows how the recording speed changes when no servo signal distortion is detected in any virtual zone of the first recording layer shown in FIG. 3 and a servo signal distortion is detected while a recording or reproducing operation is performed in a virtual zone of the second recording layer at recording speed $v_3$.

Referring to FIG. 10, if the servo distortion detection section 35 detects no servo signal distortion while a recording or reproducing operation is performed in the No. 1 to No. 7 virtual zones of the first recording layer and first detects a servo signal distortion at position $D_1$ while a recording or reproducing operation is performed in the No. 8 virtual zone of the second recording layer, the microcomputer 40 changes the rotation speed of the optical disc 2 from a rotation speed state corresponding to recording speed $v_3$ to a rotation speed state corresponding to recording speed $v_2$. The microcomputer 40 performs a recording or reproducing operation in the No. 8 virtual zone after position $D_1$ with the optical disc 2 placed in a rotation speed state corresponding to recording speed $v_2$.

When switching to the No. 9 virtual zone after completion of a recording or reproducing operation in the No. 8 virtual zone, the microcomputer 40 judges whether the rotation speed of the optical disc 2 is reduced in the No. 6 virtual zone of the first recording layer, which corresponds to (is in the same disc radial position as) the No. 9 virtual zone before a recording or reproducing operation is performed in the No. 9 virtual zone. If the obtained judgment result indicates that the rotation speed of the optical disc 2 is not reduced, the microcomputer 40 causes the rotation speed of the optical disc 2 in the No. 9 virtual zone to revert to recording speed $v_3$ in advance. After the reversion, the microcomputer 40 performs a recording or reproducing operation in the No. 9 virtual zone. The operations performed in the No. 10 to No. 15 virtual zones are the same as those described with reference to FIGS. 4, 7, 8, and 9.

According to the embodiment of the present invention, which has been described above, the time required for recording onto or reproducing from a plurality of recording layers on an optical disc is reduced, thereby providing an easy-to-use optical disc apparatus.

Further, the embodiment described above assumes that the microcomputer 40 sets seven virtual zones for the first recording layer and seven virtual zones for the second recording layer as shown in FIG. 3. However, the present invention is not limited to the use of such a virtual zone configuration. Further, the present invention is not limited to the use of the aforementioned three recording speeds (v1, v2, and v3). Furthermore, the embodiment described above assumes that the microcomputer 40, which serves as a controller, is furnished separately from the DSP 30. However, the present invention may alternatively be configured so that the microcomputer is built in the DSP.

Those skilled in the art will appreciate that numerous changes and modifications can be made to the preferred embodiment of the present invention and that such changes and modifications can be made without departing from the spirit of the present invention. The disclosed embodiment is provided to illustrate aspects of the present invention and not to limit the scope of the present invention. It is, therefore, intended that the appended claims cover all such equivalent variations as fall within the true spirit and scope of the present invention.

What is claimed is:

1. An optical disc apparatus for recording information onto or reproducing information from a plurality of recording layers of an optical disc, the optical disc apparatus comprising:
    a disc motor to rotate the optical disc;
    a motor drive circuit to drive the disc motor;
    a motor controller to control operation of the motor drive circuit;
    a distortion detector to detect a distortion in a tracking servo signal or in a focus servo signal;
    a controller arranged to set a plurality of virtual zones corresponding to a plurality of zones arranged in a radial direction of the optical disc for a plurality of recording layers of the optical disc, and to control operation of the motor controller on a basis of the virtual zone in accordance with an output from the distortion detector to change a rotation speed of the optical disc to a low speed; and
    a storage section to storage change information about a rotation speed of the optical disc changing to a low speed;
    wherein, when the distortion in the tracking servo signal or in the focus servo signal is detected by the distortion detector while a recording or reproducing operation is performed in a certain virtual zone in a first recording layer among a plurality of recording layers, the controller changes the rotation speed of the optical disc to a low speed at a position in the virtual zone in the first recording layer, the position corresponding to the position at which the distortion in the tracking servo signal or in the focus servo signal is detected, and in a second recording layer, the controller sets, before a recording or reproducing operation is performed, the rotation speed of the optical disc in all over a virtual zone which is set in the same radial position of the second recording layer as that of the virtual zone of the first recording layer, in the same rotation speed of the optical disc as the low speed changed in the virtual zone of the first recording layer, in accordance with the change information stored in the storage section.

2. The optical disc apparatus according to claim 1, wherein the distortion detector compares a distortion in the tracking servo signal or the focus servo signal with a predefined reference value, and outputs a distortion detection signal if the distortion is greater than the reference value.

3. The optical disc apparatus according to claim 1, wherein:
    when the controller changes the rotation speed of the optical disc to a low speed in the virtual zone of the first recording layer, the controller makes the storage section store the virtual zone of the first recording layer as change information, in the virtual zone the change being made; and
    when a recording or reproducing operation is to be performed in the associated virtual zone of the second recording layer, before the recording or reproducing operation the controller reads out the stored virtual zone of the first recording layer from the storage section and sets the rotation speed of the optical disc in all over the virtual zone of the second recording layer which corresponds to the read out virtual zone of the first recording layer, in the same rotation speed of the optical disc as the low speed changed in the virtual zone of the first recording layer.

4. The optical disc apparatus according to claim 1, wherein, when a recording or reproducing operation is to be performed in relation to the second recording layer, the controller determines, before the recording or reproducing operation and by an individual virtual zone of the second recording layer, whether the rotation speed of the optical disc is changed to a low speed in a virtual zone of the first recording layer that corresponds to a virtual zone of the second recording layer for which the recording or reproducing operation is to be performed, in accordance with the change information.

5. An information recording/reproducing method for recording information onto or reproducing information from an optical disc having a first recording layer and a second recording layer, the information recording/reproducing method comprising:
    a first step of setting a plurality of virtual zones corresponding to a plurality of zones arranged in a radial direction of the optical disc for a plurality of recording layers of the optical disc;
    a second step of recording information onto or reproducing information from a first recording layer of the optical disc and detecting a distortion in a tracking servo signal or in a focus servo signal;
    a third step of changing, when the distortion is detected, a rotation speed of the optical disc to a low speed at a position in a virtual zone of a first recording layer in which the distortion is detected;
    a fourth step of storing as change information the virtual zone of the first recording layer in which the rotation speed is changed, and continuing a recording or reproducing operation;
    a fifth step of proceeding to a second recording layer, and judging whether the rotation speed of the optical disc is changed to a low speed in a virtual zone of the first recording layer that corresponds to the virtual zone of the second recording layer in accordance with the stored change information before a recording or reproducing operation is performed in a virtual zone of the second recording layer;
    a sixth step of setting the rotation speed of the optical disc in all over the virtual zone of the second recording layer in the same rotation speed of the optical disc as the low speed changed in the virtual zone of the first recording layer when the obtained judgment result indicates that the rotation speed is changed to a low speed;
    a seventh step of performing a recording or reproducing operation in the virtual zone at the selected low rotation speed;
    an eighth step of judging, before proceeding to the next adjacent virtual zone from a virtual zone in which a recording or reproducing operation was performed in the seventh step and performing a recording or reproducing operation in the next virtual zone, whether the rotation speed of the optical disc is changed to a low speed in a virtual zone of the first recording layer that corresponds to the next virtual zone;
    a ninth step of changing the rotation speed of the optical disc in all over the next virtual zone to a low speed when the obtained judgment result indicates that the rotation speed for the virtual zone of the first recording layer is changed to a low speed, and changing or maintaining the optical disc for the next virtual zone to a predetermined rotation speed without switching to a low speed when the obtained judgment result indicates that the rotation speed for the virtual zone of the first recording layer is not changed to a low speed;

a tenth step of performing a recording or reproducing operation in the next virtual zone at the selected low rotation speed; and an eleventh step of repeating the eighth step, the ninth step, and the tenth step when a recording or reproducing operation is to be performed in the second next virtual zone of the second recording layer.

6. The information recording/reproducing method according to claim 5, wherein the first step is performed to set the virtual zones so that each one of the virtual zones corresponding to the first recording layer and an associated one of the virtual zones corresponding to the second recording layer are in the same disc radial positions.

7. An information recording/reproducing method in an optical disc apparatus for recording information and/or reproducing information on/from an optical disc having a first recording layer and a second recording layer, the information recording/reproducing method comprising:

setting a plurality of virtual zones corresponding to a plurality of zones arranged in a radial direction of the optical disc for a plurality of recording layers of the optical disc; detecting a distortion in one of a tracking servo signal and a focus servo signal, while a recording or reproducing operation is performed in a certain virtual zone in a first recording layer of the optical disc;

changing a rotation speed of the optical disc to a lower speed at a position in the virtual zone in the first recording layer of the optical disc, where the distortion in one of the tracking servo signal and the focus servo signal is detected;

storing change information when the rotation speed of the optical disc is changed to a lower speed at the position in the virtual zone in the first recording layer of the optical disc;

setting, before a recording or reproducing operation for the second recording layer is performed, the rotation speed of the optical disc in all over a virtual zone which is set in the same radial position of the second recording layer as that of the virtual zone of the first recording layer, in the same rotation speed of the optical disc as the low speed changed in the virtual zone of the first recording layer, in accordance with the change information; and making the optical disc rotate at the set rotation speed and performing the recording or reproducing operation for the virtual zone of the second recording layer.

* * * * *